United States Patent
Lin

(12) 
(10) Patent No.: US 6,370,655 B1
(45) Date of Patent: Apr. 9, 2002

(54) METHOD AND SYSTEM FOR REVERSED-SEQUENCE CODE LOADING INTO PARTIALLY DEFECTIVE MEMORY

(75) Inventor: Shi-Tron Lin, Taipei (TW)

(73) Assignee: Winbond Electronics Corp. (TW)

( * ) Notice: Subject to any disclaimer, the term of this patent is extended or adjusted under 35 U.S.C. 154(b) by 0 days.

(21) Appl. No.: 09/174,676

(22) Filed: Oct. 19, 1998

(51) Int. Cl.$^7$ ............................................. G06F 11/20
(52) U.S. Cl. ............................ 714/8; 714/42; 714/719
(58) Field of Search ............................... 714/8, 35, 42, 714/53, 719, 710, 711; 711/213; 712/227

(56) References Cited

U.S. PATENT DOCUMENTS

| | | | | |
|---|---|---|---|---|
| 3,938,100 A | * | 2/1976 | Steiner | 711/206 |
| 4,939,694 A | | 7/1990 | Eaton et al. | |
| 5,278,847 A | | 1/1994 | Helbig, Sr. et al. | |
| 5,373,509 A | * | 12/1994 | Katsura | 714/719 |
| 5,579,266 A | | 11/1996 | Tahara | |
| 5,644,541 A | | 7/1997 | Siu et al. | |
| H1741 H | * | 7/1998 | Cruts | 714/720 |
| 5,887,183 A | * | 3/1999 | Agarwal et al. | 712/2 |
| 6,108,797 A | * | 8/2000 | Lin et al. | 714/8 |
| 6,141,768 A | * | 10/2000 | Lin et al. | 714/8 |

OTHER PUBLICATIONS

IBM Technical Disclosure Bulletin,"Local Storage Link Registers", Dec. 1983, vol. 26, No. 7B, pp. 3948–3951.*

* cited by examiner

Primary Examiner—Scott T. Baderman
(74) Attorney, Agent, or Firm—Raymond Sun

(57) ABSTRACT

A computer system is provided that loads a computer program, in a reverse order, into a memory device having one or more defective memory cells. The program is organized into code modules with each code module including at least one complete instruction, or data block. The last code module of the program is loaded first into the last or highest addresses of the address space allocated in the memory for the program. Thereafter, the code module preceding the last loaded code module of the program is loaded into the addresses preceding the previously-loaded addresses. The subsequent code modules are loaded into successively lower memory addresses in a reverse fashion until the first code module of the program is loaded into memory. As each code module, or the codes that make up the code module, are loaded, each loaded memory address is checked for a defective cell. A JUMP instruction is created and inserted into the original program code preceding the defective memory address to bypass any defective memory cell without interrupting the intended operation of the instruction steps that are loaded into the memory. In addition, a JUMP instruction is inserted into the memory start address so that a processor is forced to begin execution at the memory address containing the first byte of the first code module. Certain byte codes that include referenced addresses are then modified to correct any address-referencing that may be changed due to the insertion of the JUMP instructions, and then loaded into the appropriate addresses in the memory.

30 Claims, 7 Drawing Sheets

| MACHINE-CODE ADDRESS | LOADED MACHINE CODE | MEMORY ADDRESS |
|---|---|---|
| 0000 | EB | 0000 |
| 0001 | 07 | 0001 |
| 0002 | 90 | 0002 |
| 0003 | C3 | 0003 |
| 0004 | C4 | 0004 |
| 0005 | D5 | 0005 |
| 0006 | D6 | 0006 |
| 0007 | E1 | 0007 |
| 0008 | E2 | 0008 |
| 0009 | 8C | 0009 |
| 000A | C8 | 000A |
| 000B | 8E | 000B |
| 000C | C0 | 000C |
| 000D | 2E | 000D |
| 000E | A0 | 000E |
| 000F | 07 | 000F |
| 0010 | 00 | 0010 |
| 0011 | ? (DEFECTIVE) | <0011> |
| 0012 | EE | 0012 |
| 0013 | B0 | 0013 |
| 0014 | E0 | 0014 |
| 0015 | 3C | 0015 |
| 0016 | FF | 0016 |
| 0017 | 74 | 0017 |
| 0018 | 04 | 0018 |
| 0019 | B0 | 0019 |
| 001A | 3F | 001A |
| 001B | B4 | 001B |
| 001C | 4C | 001C |
| 001D | EE | 001D |
|  |  | 001E |
|  |  | 001F |
|  |  | 0020 |
|  |  | 0021 |
|  |  | 0022 |
|  |  | 0023 |
|  |  | 0024 |
|  |  | 0025 |
|  |  | 0026 |
|  |  | 0027 |
|  |  | 0028 |

DIRECTION OF "FORWARD" CODE LOADING

UNUSED MEMORY SPACE

FIG.1B
PRIOR ART

| ASSEMBLER INSTRUCTION STEPS | | MACHINE CODE ADDRESS | MACHINE CODE |
|---|---|---|---|
| JMP | $+9 | 0000 | EB |
| | | 0001 | 07 |
| NOP | | 0002 | 90 |
| tab1(0) | | 0003 | C3 |
| | | 0004 | C4 |
| tab1(1) | | 0005 | D5 |
| | | 0006 | D6 |
| entry1 | | 0007 | E1 |
| entry2 | | 0008 | E2 |
| MOV | AX,CS | 0009 | 8C |
| | | 000A | C8 |
| MOV | ES,AX | 000B | 8E |
| | | 000C | C0 |
| CS: | | 000D | 2E |
| MOV | AL,([0007]) | 000E | A0 |
| | | 000F | (07) |
| | | 0010 | (00) |
| INC | DX | 0011 | 42 |
| OUT | DX,AL | 0012 | EE |
| MOV | AL,E0 | 0013 | B0 |
| | | 0014 | E0 |
| CMP | AL,FF | 0015 | 3C |
| | | 0016 | FF |
| JZ | (001D) | 0017 | 74 |
| | | 0018 | (04) |
| MOV | AL,3F | 0019 | B0 |
| | | 001A | 3F |
| MOV | AH,4C | 001B | B4 |
| | | 001C | 4C |
| OUT | DX,AL | (001D) | EE |

FIG.3A

| REFERENCING MACHINE-CODE ADDRESS (Addr1) | # OF BYTES REPRESENTING CONTENT AT CODE Addr1 | REFERENCED MACHINE-CODE ADDRESS (Addr2) | ADDRESS-REFERENCING TYPE 1=ABSOLUTE 2=RELATIVE |
|---|---|---|---|
| 000F | 2 | 0007 | 1 |
| 0018 | 1 | 001D | 2 |
| -- | -- | -- | -- |
| -- | -- | -- | -- |
| -- | -- | -- | -- |

FIG.3B

| MACHINE-CODE ADDRESS | MACHINE CODE | MACHINE-CODE MODULES |
|---|---|---|
| 0000 | EB | |
| 0001 | 07 | |
| 0002 | 90 | |
| 0003 | C3 | A |
| 0004 | C4 | |
| 0005 | D5 | |
| 0006 | D6 | |
| 0007 | E1 | B |
| 0008 | E2 | |
| 0009 | 8C | C |
| 000A | C8 | |
| 000B | 8E | D |
| 000C | C0 | |
| 000D | 2E | |
| 000E | A0 | |
| 000F | (07) | E |
| 0010 | (00) | |
| 0011 | 42 | |
| 0012 | EE | |
| 0013 | B0 | |
| 0014 | E0 | F |
| 0015 | 3C | |
| 0016 | FF | |
| 0017 | 74 | G |
| 0018 | (04) | |
| 0019 | B0 | |
| 001A | 3F | |
| 001B | B4 | H |
| 001C | 4C | |
| 001D | EE | |

FIG.6A

| LOADED MACHINE CODE | LOADED MACHINE-CODE MODULE | MEMORY ADDRESS |
|---|---|---|
| EB 09 | JMP | 0000 0001 |
| | | 0002 0003 0004 0005 0006 0007 0008 0009 000A |
| EB 07 90 C3 C4 D5 D6 | A | 000B 000C 000D 000E 000F 0010 0011 |
| E1 E2 | B | 0012 0013 |
| 8C C8 | C | 0014 0015 |
| 8E C0 | D | 0016 0017 |
| 2E A0 (12) (00) 42 EE | E | 0018 0019 001A 001B 001C 001D |
| B0 E0 3C FF | F | 001E 001F 0020 0021 |
| 74 (04) | G | 0022 0023 |
| B0 3F B4 4C EE | H | 0024 0025 0026 0027 0028 |

DIRECTION OF "BACKWARD" CODE-MODULE LOADING

| LOADED MACHINE CODE | LOADED MACHINE-CODE MODULE | MEMORY ADDRESS |
|---|---|---|
| EB | JMP | 0000 |
| 04 |  | 0001 |
|  |  | 0002 |
|  |  | 0003 |
|  |  | 0004 |
|  |  | 0005 |
| EB |  | 0006 |
| 07 |  | 0007 |
| 90 |  | 0008 |
| C3 | A | 0009 |
| C4 |  | 000A |
| D5 |  | 000B |
| D6 |  | 000C |
| E1 | B | 000D |
| E2 |  | 000E |
| 8C | C | 000F |
| C8 |  | 0010 |
| 8E | D | 0011 |
| C0 |  | 0012 |
| 2E |  | 0013 |
| A0 |  | 0014 |
| 0D | E | 0015 |
| 00 |  | 0016 |
| 42 |  | 0017 |
| EE |  | 0018 |
| B0 |  | 0019 |
| E0 | F | 001A |
| 3C |  | 001B |
| FF |  | 001C |
| EB | JMP | 001D |
| 03 |  | 001E |
| ? |  | <001F> |
| 3C |  | 0020 |
| FF |  | 0021 |
| 74 | G | 0022 |
| 04 |  | 0023 |
| B0 |  | 0024 |
| 3F |  | 0025 |
| B4 | H | 0026 |
| 4C |  | 0027 |
| EE |  | 0028 |

FIG.7B

| LOADED MACHINE CODE | LOADED MACHINE-CODE MODULE | MEMORY ADDRESS |
|---|---|---|
| EB | JMP | 0000 |
| 03 |  | 0001 |
|  |  | 0002 |
|  |  | 0003 |
|  |  | 0004 |
| EB |  | 0005 |
| 07 |  | 0006 |
| 90 |  | 0007 |
| C3 | A | 0008 |
| C4 |  | 0009 |
| D5 |  | 000A |
| D6 |  | 000B |
| E1 | B | 000C |
| E2 |  | 000D |
| 8C | C | 000E |
| C8 |  | 000F |
| 8E | D | 0010 |
| C0 |  | 0011 |
| 2E |  | 0012 |
| A0 |  | 0013 |
| 0C | E | 0014 |
| 00 |  | 0015 |
| 42 |  | 0016 |
| EE |  | 0017 |
| B0 |  | 0018 |
| E0 | F | 0019 |
| 3C |  | 001A |
| FF |  | 001B |
| 74 | G | 001C |
| 0A |  | 001D |
| EB | JMP | 001E |
| 04 |  | 001F |
| ? |  | <0020> |
| 02 |  | 0021 |
| ? |  | <0022> |
| 04 |  | 0023 |
| B0 |  | 0024 |
| 3F |  | 0025 |
| B4 | H | 0026 |
| 4C |  | 0027 |
| EE |  | 0028 |

DIRECTION OF CODE-MODULE LOADING

METHOD AND SYSTEM FOR REVERSED-SEQUENCE CODE LOADING INTO PARTIALLY DEFECTIVE MEMORY

BACKGROUND OF THE INVENTION

1. Field of the Invention

The present invention relates to computer systems, and in particular, to a system and method for loading a program in a reverse order into a memory having one or more defective memory cells.

2. Description of the Prior Art

Memory chips have now reached a high level of technological advancement in which these devices are now capable of storing over a million bits of information in a single semiconductor chip. Since each bit requires at least one transistor and associated circuitry to implement, even the best manufacturing fabrication lines will still turn out memory devices that have numerous bad parts, or memory cells. In the past, memory devices with bad memory cells were typically discarded, thereby resulting in waste and economic loss.

To address this problem, attempts were made to cause a memory device having some defective memory cells to behave as a defect-free memory device. One approach involved the actual repair of defective memory cells or addresses. Actual repair can be accomplished by providing a redundant or substitute memory to store data or program code intended for the defective memory cells or addresses in the memory device. Associated circuitry or software is provided to "link" the defective cells from the regular memory cells to the designated replacement cells in the redundant memory. Laser repair is used to "link" the defective addresses to the designated replacement addresses. Unfortunately, the provision of a redundant memory requires the inclusion of both the redundant memory and additional circuitry, which complicates the design and increases the cost of the memory device. In addition, this approach does not adequately address the situation where either or both the redundant memory and the additional circuitry may be defective.

Yet other attempts have provided memory devices that were both self-testing and self-correcting, such that the efficacy of regular memory cells can be tested while the memory device is in use, and any defective cells can be repaired or corrected by assigning corresponding replacement cells from the redundant memory to replace the defective cells. The location of defective memory cells can be located by any known testing procedure, such as, for example, by alternatively writing "1" and "0" in each bit location and-then verifying the accuracy of the results. Again, these memory devices experience the same problems described above.

In addition, conventional memory devices that are provided is in the form of an integrated circuit (IC) chip are typically put through an extensive testing procedure during manufacture thereof. Extensive testing of both the logic functions and the memory cells are performed at both the wafer level and at the assembled-package level. Laser repair can also be performed after wafer-level testing. Unfortunately, the testing of on-chip memory is very time-consuming since every memory cell must be tested. In contrast, the testing of logic functions on a chip is less intensive. Therefore, the testing of on-chip memory significantly increases the cost of manufacturing the memory devices.

Furthermore, the conventional method of loading machine code into memory is a "forward" approach that follows the steps illustrated in FIG. 1A. In step 12, the first byte code (e.g. "EB" in FIG. 1B), associated with the first machine code address 0000, is loaded into the first memory address 0000 (all addresses are in hexadecimal). In step 14, the next byte code (e.g., "07". in FIG. 1B), associated with the next machine code address 0001, is loaded into the next sequential memory address 0001. In step 18, a determination is made whether the last byte code has been loaded. If yes, then the loading is complete. If no, the processing proceeds to step 14 to load the next byte code. Accordingly, each subsequent byte code is successively loaded into the memory at a subsequent address corresponding to the machine code address, associated with the byte code. Once the last byte code (e.g., "EE" in FIG. 1B), associated with machine code address 001D, has been loaded into memory address 001D, the loading is completed.

FIG. 1B illustrates an exemplary program code and how it is loaded into memory following the conventional "forward" code loading approach (see arrow that shows the direction of the forward loading). It is noted that the first byte of the machine code is first loaded in the lowest address (i.e., 0000), the next byte is then loaded in a subsequent address, and so on, until the last byte is loaded. in an address equal to the highest machine code address (i.e., 001D), associated with the last byte of the program code. The memory addresses greater than 001D (i.e., 001E to 0028) are not used.

Unfortunately, the "forward" loading scheme has the disadvantage that, once the machine code is loaded into memory, errors that may be due to the existence of one or more defective memory cells can be difficult to correct. For example, the memory shown in FIG. 1B has a defective cell at memory address 0011. Accordingly, instead of a valid byte code at this address location, this location contains invalid information or garbage. In a write-once memory (e.g., a programmable read only memory (PROM), or EPROM), where it is not possible or not convenient to test the memory cells prior to the loading of the machine code for a program, the defective cell at address 0011 will cause the loading of the program code to fail. Moreover, the error is not correctable since the contents of the PROM cannot be over-written. In addition, the contents of the an EPROM cannot be easily erased and rewritten without applying special techniques such as UV exposure.

SUMMARY OF THE DISCLOSURE

It is therefore an object of the present invention to provide a computer system and method which overcomes the above-referenced problems.

It is a further object of the present invention to provide a computer system and method in which memory devices having some defective memory cells are made to behave as a defect-free memory device.

It is yet another object of the present invention to provide a computer system and method which can be implemented without adding any additional hardware or memory cells.

It is yet a further object of the present invention to provide a computer system and method which eliminates the need for actual repair or correction of defective memory cells.

It is yet a further object of the present invention to provide a computer system and method which eliminates the need for scanning the memory for defects prior to loading the machine code of the program. Instead, the present invention detects and bypasses defects while loading the program (i.e., "on-the-fly" detection and correction during loading).

It is yet a further object of the present invention to provide a computer system and method which provides the ability to perform forward address-referencing byte code modification during the loading of the machine code.

It is yet a further object of the present invention to provide a computer system and method which allows for the loading of either the original machine code or an adjusted version of the machine code with modified memory-address referencing byte codes.

It is yet a further object of the present invention to provide a computer system and method in which write-once memory devices having some defective memory cells can be made to behave as a defect-free memory device.

In order to accomplish the objects of the present invention, there is provided a computer system that loads a computer program, in a reverse order, into a memory device having one or more defective memory cells. The program is organized into code modules with each code module including at least one complete instruction or data block. The last code module of the program is loaded first into the last or highest addresses of the address space allocated in the memory for the program. Thereafter, the code module preceding the last loaded code module of the program is loaded into the address preceding the previously-loaded address. The subsequent code modules are loaded into successively lower memory addresses in a reverse fashion until the first code module of the program is loaded into memory.

As each code module, or the codes that make up the code module, are written into a group of memory addresses, a read operation is performed on the memory addresses in that same group, and the read values are compared with the written values. If there is a mis-match at any address, then a defective memory cell exists at that address. The present invention creates and inserts a JUMP instruction into the original program code preceding the defective memory address to bypass any defective memory cell without interrupting the intended operation of the instruction steps that are loaded into the memory. If while loading the JUMP instruction, another memory defect is detected, the present invention creates and inserts another JUMP instruction into the original program code preceding the defective memory address (corresponding to the previous JUMP instruction that failed to load) to bypass any defective memory cell.

A JUMP instruction is also inserted into the memory start address so that a processor is forced to begin execution at the memory address containing the first byte of the first code module. Certain byte codes that include referenced addresses are then modified to correct any address-referencing that may be changed due to the insertion of the JUMP instructions, and then loaded into the appropriate addresses in the memory.

BRIEF DESCRIPTION OF THE DRAWINGS

FIG. 1B is an example of program code that is loaded in accordance with the conventional forward code loading procedure of FIG. 1A;

FIG. 3A illustrates exemplary machine code and associated machine code address and assembly language instruction steps;

FIG. 3B is an address referencing table corresponding to FIG. 3A;

FIGS. 6A–6B illustrate an example of reverse machine-code loading in accordance with one embodiment of the present invention when the memory does not have any defective memory cells;

FIG. 7A illustrates an example of the reverse machine-code loading of FIG. 6 when the memory has one or more defective memory cells; and FIG. 7B illustrates another example of the reverse machine-code loading of FIG. 6 when the memory has one or more defective memory cells.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known circuits and components are omitted so as to not obscure the description of the present invention with unnecessary detail.

Before further describing the embodiments and methods of the present invention, a brief background of conventional machine code and its processing will be provided. A computer program typically consists of executable machine code which is generated from the source code of a computer program by the operation of a compiler. This compiled machine code is typically stored in an input device, such as an on-chip Read Only Memory (ROM) or a hard drive, or an external memory device, such as a floppy disk, CD ROM, or tape.

As the executable machine code is obtained or retrieved from the input device, the machine code is loaded into a dynamic memory (such as a RAM) for program execution. The term "loaded" or "loading" has the same meaning as "write" or "writing" into the memory.

Figure 2A:
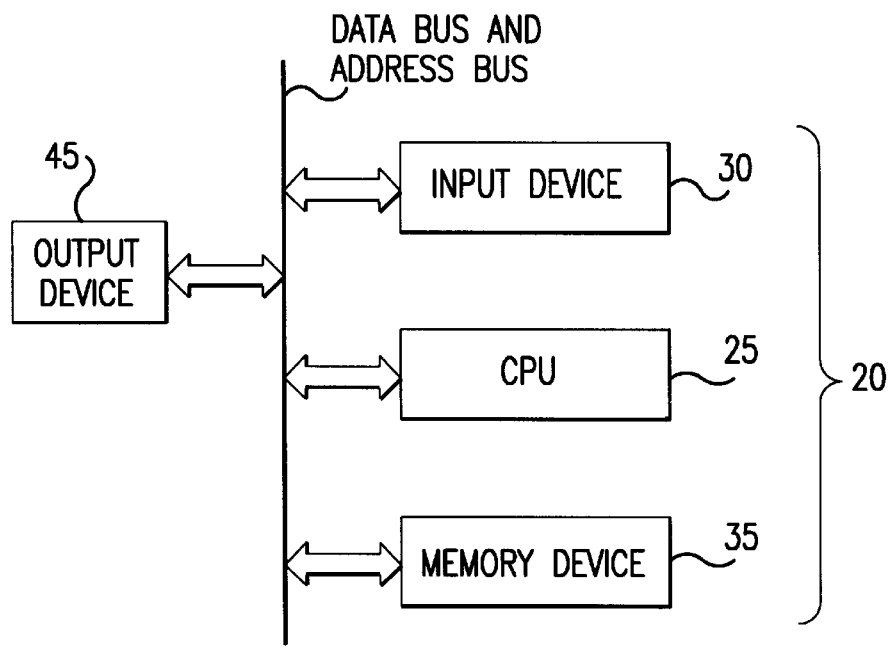
FIG. 2A is a general schematic view of a computer system in which the present invention can be used.

FIG. 2A is a simple schematic illustration of a computer system 20 in which the present invention may be implemented. The computer system 20 may be implemented in the form of a microcomputer. The computer system 20 includes a CPU 25 which controls the loading of a computer program (which is stored in machine code format) from an input device 30 to a memory device 35 where the computer program is to be executed. The input device 30 can be implemented in the form of an on-chip Read Only Memory (ROM) or a hard drive, or an external memory device, such as a floppy disk, CD ROM, or tape. The CPU 25 also controls the execution of the computer program from the memory device 35. In this embodiment, the memory device 35 is preferably implemented in the form of a write-only memory device, such as a PROM or EPROM. The computer system 20 can also include an output device 45, such as a printer, monitor, computer screen, or other display device, which outputs and displays the images and results of the processing done by the computer program.

Figure 2B:
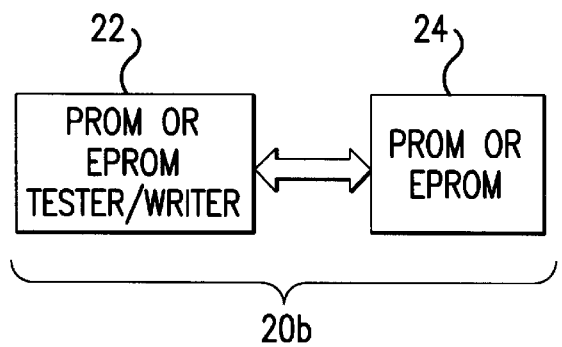
FIG. 2B is a general schematic view of another system in which the present invention can be used.

FIG. 2B is a simple schematic illustration of another system 20b in which the present invention may be implemented. The system 20b includes a PROM or EPROM writer/tester 22 and a memory device 24, such as a PROM or EEPROM. The tester/writer 22 may include a processor. In the system 20b, machine code can be loaded from a source to the memory device 24 using the writer/tester 22. This source can be another memory device (not shown), or can be a memory provided in the writer/tester 22.

Figure 2C:
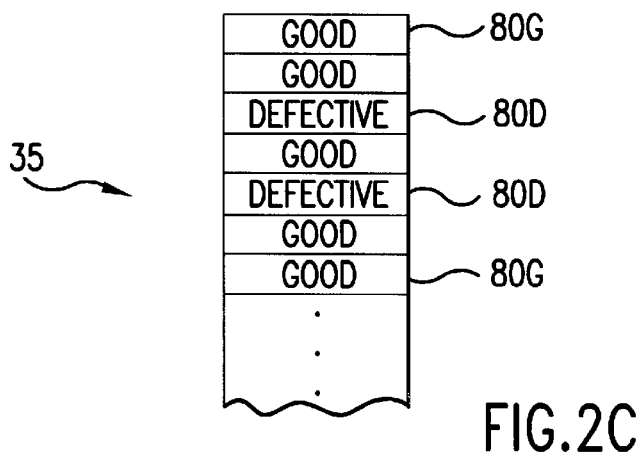
FIG. 2C is a simple illustration of a portion of the memory device of FIG. 2A.

A portion of a memory device, such as memory device 35, is illustrated in greater detail in FIG. 2C. Although memory device 35 is being illustrated in FIG. 2C, the memory device in FIG. 2C can be any memory device into which program code is loaded, and from which the code is executed. The memory device 35 includes a plurality of memory addresses or cells 80 arranged sequentially. In a typical memory device 35, most of the cells 80 are good cells 80G. Unfortunately, there will usually be a few defective cells 80D. The present invention provides a system and method that operates to bypass the defective cells 80D, thereby causing the memory device 35 to behave as a defect-free memory device.

FIG. 3A illustrates exemplary machine code and associated machine code address and assembly language instruction steps. Assembly language instructions and operands, if any, are listed in the first column. Machine code addresses are listed in the second column. The machine code addresses include a start address (Code_Start_Addr) and an end address (Code_End_Addr). Machine code instructions, corresponding to the assembly language instructions, are listed in the third column. The exemplary machine code in this FIG. 3A will be used to illustrate the present invention hereinafter.

FIG. 3B is an address referencing table corresponding to FIG. 3A. The first column lists referencing machine code addresses (Addr1). The second column lists the number of bytes that represent the content at code Addr1. The third column lists the referenced machine code address (Addr2). The fourth column indicates whether the address referencing type is absolute (Type1) or relative (Type2).

In absolute address referencing, the number of the byte content starting at memory address Addr1 is related to the referenced memory address Addr2. In relative address referencing, the number of the byte content starting at memory address Addr1 is related to the difference between the referenced memory address Addr2 and the referencing memory address Addr1. Depending on the processor system, the number of bytes to represent the content of address referencing can be one or more bytes. If two bytes are needed to represent the content at memory address Addr1, depending on the processor system, the higher byte may need to be loaded into memory after the lower byte. For example, if the bytes "0007" are to be loaded into memory, the lower byte "07" is loaded first into a first memory location, and the higher byte "00" is loaded next into a second memory location, where the second memory location is at a higher address than the first memory location.

Forward address referencing is defined as address referencing when the referenced address Addr2 is at a higher address than the referencing address Addr1. Backward address referencing is defined as address referencing when the referenced address Addr2 is at a lower address than the referencing address Addr1.

An example of a backward, absolute, address referencing is found at code address 000E in FIG. 3A. The instruction "MOV AL, [0007]" contains an absolute address referencing with referenced address (Addr2) at "0007", a lower address than the referencing address (Addr1), which is at "000F". Type1 indicates that absolute address referencing is involved. The number of bytes representing the content at code address Addr1 is two, indicating that the two-byte content at code addresses "000F" and "0010" contain the referenced address information (i.e., "07" is loaded first and "00" is loaded next).

An example of forward, relative, address referencing is found at code address "0017". The instruction "JZ 001D" contains a relative address referencing with referenced address (Addr2) at 001D, a higher address than the referencing address (Addr1), which is at "0018". Type2 indicates that relative address referencing is involved. The number of bytes representing the content at code address Addr1 is one, indicating that the one byte content at code address "0018" contains the relative address information "04"(i.e., Addr2 is at a code address that is 4+1 byte addresses higher than Addr1, or 0018+4+1=001D).

When a processor (e.g. CPU 25) executes program instruction steps and encounters an address, the processor refers to the table of FIG. 3B to determine the type of referencing. The table of FIG. 3B can be produced manually or by a compiler or other software, and can be loaded into and stored in any good memory (i.e., memory without defective cells) that is accessible to the processor.

Figure 1A:
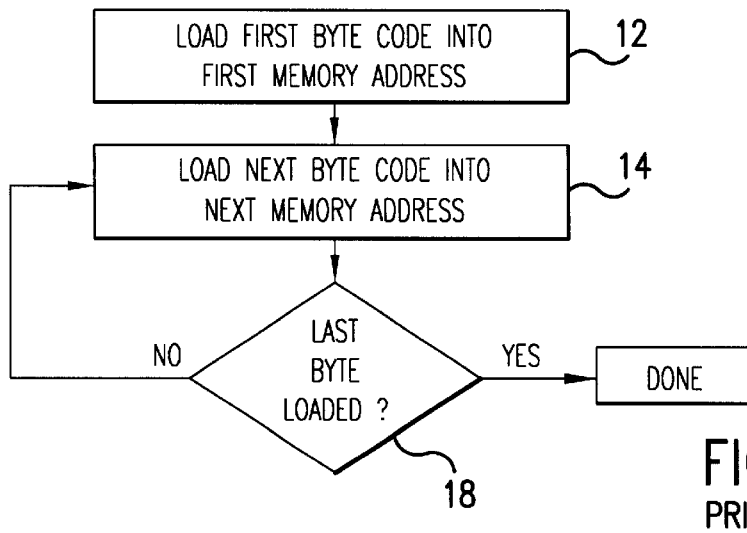
FIG. 1A is a flowchart illustrating a conventional forward code loading procedure.
Figure 4:
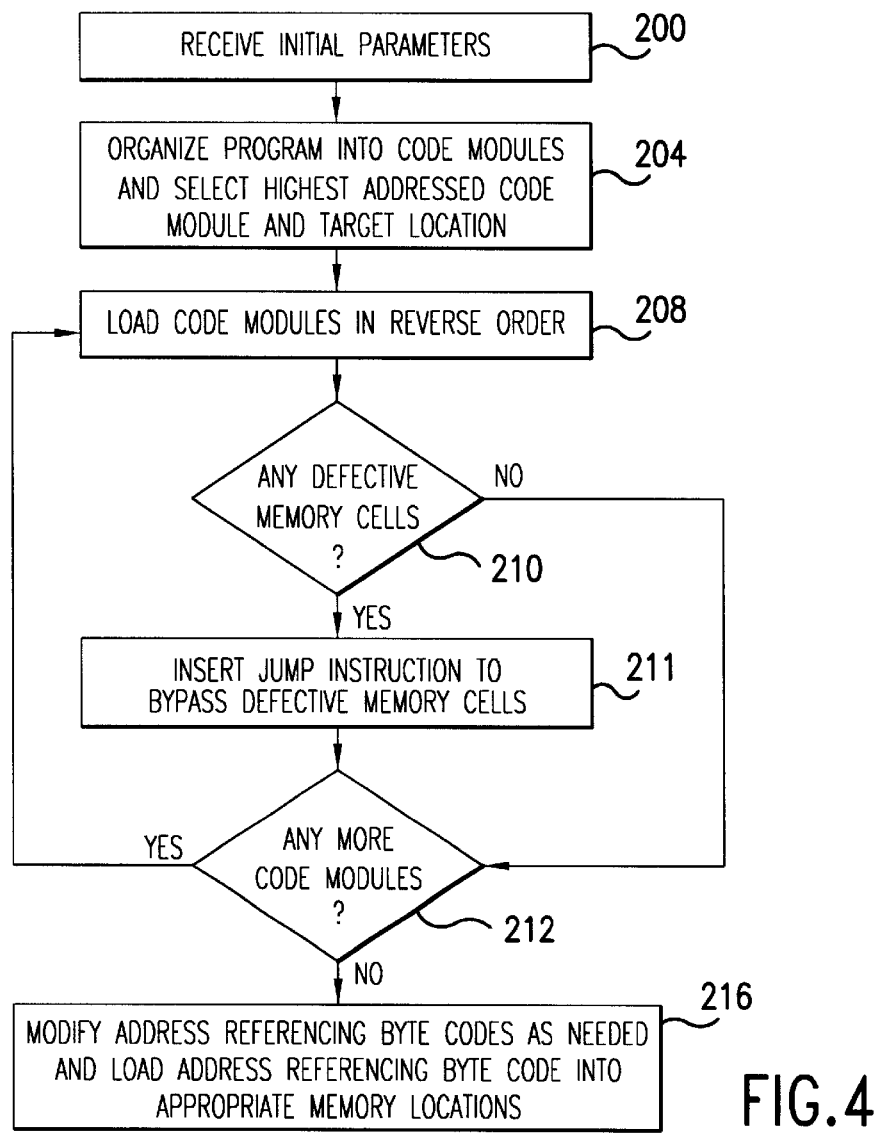
FIG. 4 is a flow-chart illustrating how the machine code of a program is loaded into the memory system of FIG. 2 in accordance with one embodiment of the present invention.

FIG. 4 is a flow-chart illustrating one embodiment of how the machine code of a program is loaded into the memory system of the present invention. The machine code has a predetermined number of instructions, which occupy a predetermined number of bytes (also referred to herein as "byte size"). The machine code is also comprised of a plurality of "code modules", which are described in greater detail below. Each code module can have a byte size of one or more.

In step 200, initial parameters and information are received. Such parameters can include modularized code, program start address, and target memory addresses (i.e., memory start address (Mem_Start_Addr) and memory end address (Mem_End_Addr)), among others. In step 204, the last machine code module is selected, and a target memory location is also selected. The section of memory in the target memory location ("target memory section") has sufficient byte-size memory space to accomodate the size of the code module to be loaded, and can be selected to be at or near the Mem_End_Addr. In step 208, the last machine code module is loaded into the target memory section, except that any address referencing bytes are not loaded at this time. In step 210, a determination is made whether there is a defective memory cell within the target memory section. If a defective memory cell exists in the target memory section, then in step 211, a JUMP instruction is created and loaded into subsequently lower memory addresses to functionally bypass the defective cell (described in greater detail below), and processing proceeds to step 212 described below. If no defective memory cell exists in the target memory section, then in step 212, a determination is made as to whether there are further code modules to load. If yes, processing returns to step 208. If no, then in step 216, all address referencing byte codes are modified (if necessary) and loaded into corresponding memory locations, based on the extra JUMP instructions already loaded into memory, and the number of memory cells skipped by these extra JUMP instructions.

In carrying out the steps of the present invention, the additional code representing the "JUMP" instructions cannot be freely inserted into the machine code, since the additional code may be inadvertently inserted inside an instruction step, thereby interrupting a data sequence or changing the meaning of an instruction. Therefore, the present invention provides a mechanism for the system 20 to determine the appropriate insertion points for the additional code to be loaded into the memory cells 80 in a manner without changing the functionality of the original machine code.

In the present invention, the entire machine code for the computer program is divided into a plurality of decodable "code modules" that can be recognized by the CPU 25 during the loading of the program code. A "code module" can take the form of a number of complete instruction steps (or microinstructions), or a block of data declaration.

Figure 5:
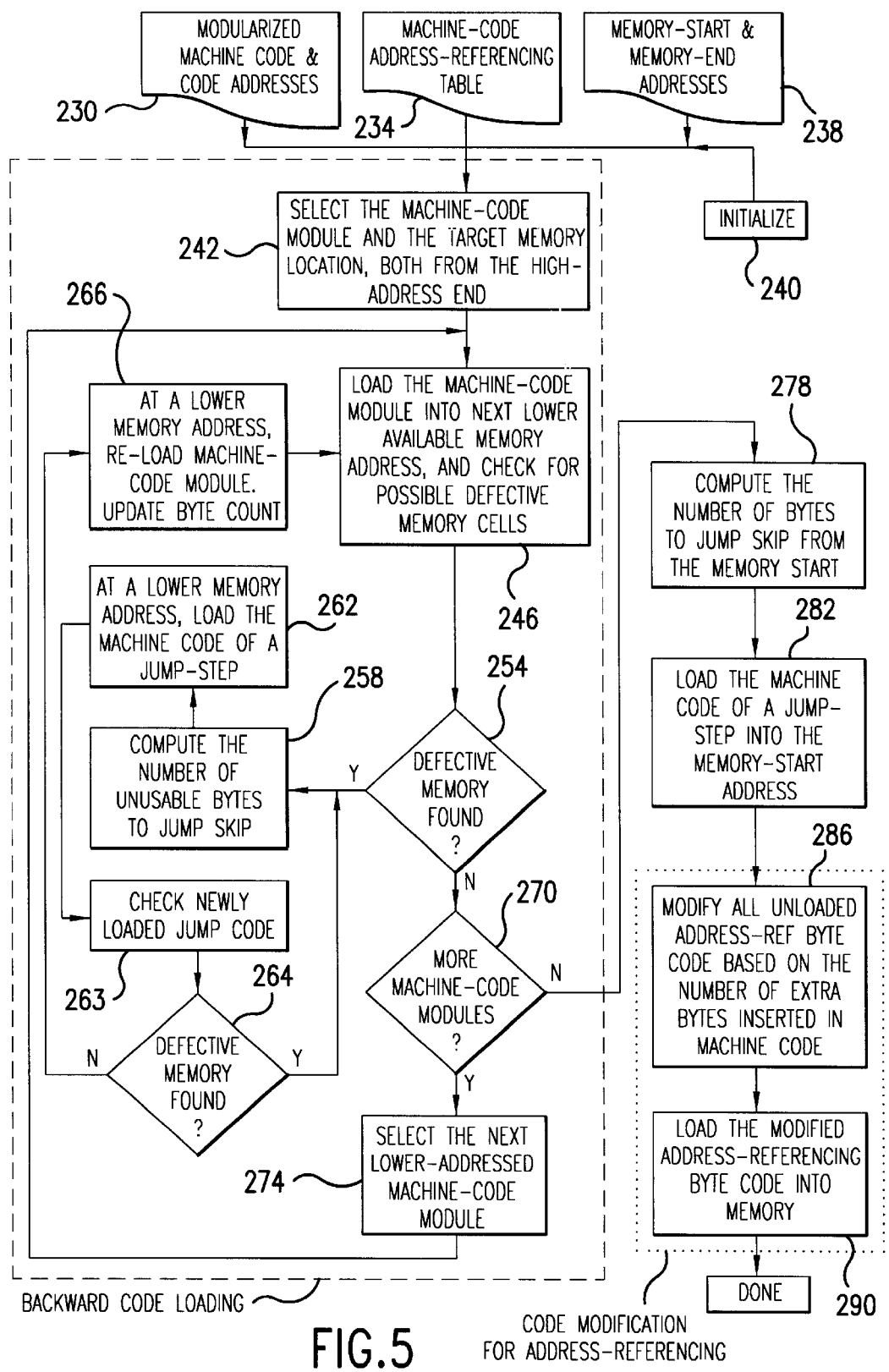
FIG. 5 is a flow-chart illustrating in greater detail the procedure illustrated in FIG. 4.

FIG. 5 illustrates in greater detail the backward loading procedure of the present invention that is described in FIG. 4A. In step 230, machine code that includes one or more machine code modules and associated code addresses are received by the CPU 25. In step 234, a machine code address reference table is either received or generated by the CPU 25. For example, for the machine code of FIG. 3A, the address reference table of FIG. 3B will be generated. In step 238, the Mem_Start_Addr and the Mem_End_Addr are recognized by the CPU 25. It is important that the number of bytes (i.e., memory addresses or cells) between the Mem_Start_Addr and the Mem_End_Addr are greater than the byte size of the entire machine code to be loaded. Otherwise, the machine code to be loaded will not fit in the target memory location. The Mem Start Addr and the Mem End Addr are for loading of the machine code. As explained above, the Mem_Start_Addr does not have to be the "0000" address of the memory space, and can start from any address in a memory where memory space is available for loading code.

In step 240, parameters are initialized. For example, an inserted byte count (ins_bcnt) is set to zero, and a total program inserted byte count (ttl_prgrm_ins_bcnt) is set to a value calculated as follows:

ttl_prgrm_ins_bcnt=(Mem_End_Addr−Mem_Start_Addr)−(Code_End_Addr−Code_Start_Addr)

In other words, the total memory space to be occupied or used by the program will be equal to the total byte size of the original program's machine code plus the "ttl_prgrm_ins_bcnt".

In step 242, a machine code module from the machine code, and a target memory location for this code module, are selected. Specifically, the highest addressed code module (i.e., the last code module) of the program's machine code is selected to be loaded first, and the mem_End_Addr can selected as the last byte of the target memory location (i.e., the Code_End_Addr). Alternatively, the the Code_End_Addr can be selected to be near the Mem_End_Addr. In step 246, the last machine code module of the program's machine code is loaded into the target memory location in a backward fashion (as explained below), and the memory cells 80 in the target memory location are checked for defects. The memory cells 80 can be checked for defects on a byte-by-byte basis (i.e., after each byte code is loaded) or after a complete code module has been loaded.

An exemplary code module might include a last byte (byte_n), a byte preceding the last byte (byte_n−1), and a first byte (byte_1). When loading this code module in a backward fashion, the last byte is first loaded into a last (or highest) address in a target location (addr_n), which would be the Code_End_Addr for the first code module to be loaded. Next, the byte preceding the last byte (byte_n−1) is loaded into an address (addr_n−1) preceding the last address (addr_n) of the target location. The successive preceding bytes are loaded until the first byte (byte_1) of that code module is loaded into the corresponding memory address of the target location. Numerical examples are described hereinafter with reference to FIGS. 7A and 7B. Each code module is loaded in a similar backward fashion, with the highest addressed code bytes loaded first. This backward loading sequence provides the advantage that the loading of the code module can be halted whenever a defective memory cell 80D is found. By checking the code immediately after a previous code has been loaded, a defective memory cell 80D can be detected. For example, after writing a byte code to memory, a simple read operation, followed by a comparison of the read value to the value written, can detect whether a memory is defective. As described above, this check can be performed on a byte-by-byte basis or after a complete code module has been loaded.

Two additional determinations are also made during the loading performed in step 246. First, a determination is made as to whether a byte code address matches a referencing address (Addr1) in the address-referencing table whose code has not yet been loaded. If so, then the byte can be left empty (or unloaded) until step 290 described below. Second, a further determination is made as to whether a current memory address is the memory start address (Mem_Start_Addr). If yes, then the loading is stopped and an error signal is provided since there is insufficient memory to load the entire machine code while bypassing all the defective memory cells 80D.

In determination block 254, a determination is made as to whether any of the just-loaded memory cells 80 for that code module are defective. If one or more defective memory cells 80D are found, then a JUMP instruction is added to bypass the defective memory cell(s) 80D. As described above, this check can be performed on a byte-by-byte basis or after a complete code module has been loaded. If done after a complete code module has been loaded, in step 258, the number of unusable bytes is first determined. This would include the defective memory cell(s) 80D and other possibly good memory cells 80G that are occupied by the just-loaded code module (see the code loaded into memory addresses 0020 and 0021 in FIG. 7A, described below). Then in step 262, the CPU 25 constructs the machine code for a JUMP instruction having the number of bytes determined in step 258, and the JUMP instruction is loaded in an unused address preceding the address of the defective memory cell 80D having the lowest address (if there are more than one defective memory cells 80D for the just-loaded code module). It is noted that the JUMP instruction can be represented by a different number (e.g., two or more) of bytes depending on the processor. In a 80×86 microprocessor, for example, the constructed machine code would be "EB x", where x=n−2 in hexadecimal code. For example, if n=12, the two bytes "EB 0A" would have the "JUMP" step skip a total of ten bytes, which is exclusive of the two memory bytes occupied by the machine code for the "JUMP" instruction itself.

Then, in step 263, the memory cells 80 holding the code for the newly-loaded JUMP instruction are checked for a defect. In determination block 264, a determination is made as to whether any of the just-loaded memory cells 80 (i.e., containing the just-loaded JUMP instruction) are defective. If the determination is "no", then processing proceeds to step 266 below. If one or more of the memory cells 80 that contain the just-loaded JUMP instruction are defective, then steps 258, 262, 263 and 264 are repeated to create and load another JUMP instruction that would bypass the previously-determined (i.e., for the current code module) and just-determined defective memory cells 80D. Processing then proceeds to step 266.

In step 266, the code module that was supposed to have been loaded into a target memory location that is occupied by the defective memory cell(s) 80D is re-loaded into the group of memory addresses immediately preceding the address of the just-loaded JUMP instruction. During this step 266, the inserted byte count (ins_bcnt) is updated to reflect the number of bytes inserted between the just-loaded code module and the previous code module that are needed to bypass the defective memory cell(s) 80D. The number of inserted bytes includes the bytes corresponding to the JUMP instruction and the bytes of unusable defective memory 80D. Processing then returns to step 246.

Steps 258, 262, 263, 264 and 266 can also be performed in the same manner to accomplish the same result if the check for a defective memory cell 80D is done on a byte-by-byte basis.

Thus, in comparing the two checking techniques, if the check is done after a complete code module has been loaded, there may be a possibility that a few good memory cells 80 may be unused (i.e., bypassed) since they may be adjacent the defective memory cell 80D, while the "byte-by-byte" technique would not leave any unused good memory cells 80.

Now referring back to the operation as described in FIG. 5, if the determination of decision block 254 is that the memory cells 80 for the just-loaded code module are not defective, then a further determination is made in decision block 270 as to whether there are more code modules to be loaded. If there are more code modules to be loaded, then in step 274, the code module preceding the just-loaded code module is selected, and processing returns to step 246. Thereafter, successive preceding code modules are loaded until a first code module of the entire program is loaded.

On the other hand, if there are no more code modules to be loaded, then in step 278, the number of bytes required to jump from the memory start address (Mem_Start_Addr) to the address where the first byte of the machine code is loaded (i.e., Code_Start_Addr) is determined based on the difference between the Mem_Start_Addr (usually address "0") and the last loaded address. In step 282, a JUMP instruction having the number of bytes determined in step 278 is loaded into the Mem_Start_Addr so that during program execution, the machine code jumps from the Mem_Start_Addr directly to the first byte of the first code module of the program.

In step 286, any unloaded address reference byte codes are modified based on the number of extra bytes inserted into the machine code. The number of extra bytes is recorded in inserted-byte count (ins_bcnt), which is updated in step 266 every time a JUMP instruction is inserted into the machine code. Finally, in step 290, the modified address reference byte codes are loaded into the appropriate memory addresses. The program is now ready to be executed by the CPU 25.

The addressing modification of step 286 is based on the number of extra bytes inserted between successfully loaded code modules. Based on the address-referencing table (such as FIG. 3B), the content of the byte code at Addr1 is modified and then loaded into a corresponding memory address (Addr1_new) as follows:

Addr1_new=Addr1+total inserted bytes prior to Addr1 In addition, the content of Addr1 is modified (increased) by either (1) the total inserted bytes prior to Addr2 (for absolute-address referencing), or (2) the total inserted bytes prior to Addr2 minus the total inserted bytes prior to Addr1 (for relative-address referencing).

FIGS. 6A and 6B illustrate an example of reverse machine-code loading (also referred to herein as "backward" loading) in accordance with one embodiment of the present invention when the memory device 35 does not have any defective memory cells 80D. The machine code of FIG. 3A is organized in FIG. 6A into code modules denoted "A" through "H". FIG. 6A illustrates the machine code loaded in a conventional forward-loading scheme starting at the first memory address 0000, while FIG. 6B illustrates the machine code loaded in accordance with the backward-loading scheme of the present invention.

In accordance with steps 242, 246, 254, 270 and 274 of FIG. 5, code module H is first loaded into a highest designated target memory location at addresses 0024 to 0028. Subsequently, modules G, F, E, D, C, B and A are loaded in a backward fashion or reverse order when compared to a conventional forward loading scheme. When loaded in a backward fashion, the machine code occupies the memory space defined by the address range 000B to 0028. In contrast, when the machine code is loaded by employing the conventional forward loading scheme, the machine code would occupy the memory space defined by the address range 0000, to 001D. It is noted that since the memory does not have any defects, steps 258 to 266 of FIG. 4B are not executed since the determination of decision-block 254 is always "no".

Thereafter, in accordance with steps 278 and 282 of FIG. 5, a JUMP instruction is created and loaded at the beginning of a designated memory space. In this case, the JUMP instruction machine code is "EB 09", which directs program execution to jump to address 000B (i.e., 0002+9=000B, where 0002 is the next byte address after the "EB 09"1 instruction), which is where the first code module begins (i.e., the Code_Start_Addr).

Then, in accordance with steps 286 and 290 of FIG. 5, modifications to the address-referencing codes are performed based on the address-referencing table of FIG. 3B. Thus, the addresses referenced in addresses 000F and 0018 in FIG. 6A are modified.

For absolute address referencing, Addr1 is at 000F, n-byte is equal to 2, and Addr2 (i.e., the referenced address) is equal to 0007. The number of bytes inserted before the code address Addr2 is 11 (i.e., the number of bytes from memory address 0000 to 000A). The 2-byte content at the code address 000F is modified from 0007 to 0012 and loaded as two bytes "12" and "00", at memory addresses 001A and 001B, respectively (i.e., 7+11=18, which when converted to hexadecimal notation, is 0012). The new address of 000F is determined by the following: Addr1_new=000F +11=001A.

It is noted that memory addresses 001A and 001B were not loaded during the loading of the program code according to steps 242, 246, 254, 270 and 274 of FIG. 5 since the CPU 25 recognizes that these two addresses are to contain referencing information, so that they are being loaded for the first time now. Otherwise, since the memory device 35 is a write-only memory, it would be difficult to over-write any previously-loaded code. The same applies for all addresses discussed hereinbelow that are intended to contain referencing information.

For relative address referencing, Addr1 is at 0018, n-byte is equal to 1, and Addr2 (i.e., the referenced address) is equal to 001D. Since there were no bytes inserted between code addresses Addr1 and Addr2, no modification is made to the one-byte content at the code address. Accordingly, the byte code "04" is loaded without modification at the new address of 0023, which is determined by the following: Addr1_new=0018+11=0023 (in hexadecimal). As illustrated in FIG. 6, the machine code loaded in accordance with the "backward" loading approach of the present invention executes in an identical manner to the original machine code program if it were loaded using a conventional forward-loading scheme.

FIG. 7A illustrates an example of reverse machine-code loading as described in FIG. 5. In this example, the machine code is the same as that illustrated in FIG. 6A. In addition, one location in memory (i.e., memory address 001F) is defective, and the memory device 35 contains memory addresses 0000, to 0028 in hexadecimal. First, according to steps 242, 246 and 254, code module H is successfully loaded into the last five memory addresses 0024 to 0028. Next, code module G is loaded successfully into memory addresses 0022 to 0023, according to steps 246 and 254. However, the loading of module F is unsuccessful because of the defective memory cell at address 001F, since the byte check of steps 246 and 254 will detect the defective memory cell at 001F.

Therefore, in accordance with steps 258 and 262, a JUMP instruction (i.e., code "EB 03") is constructed and loaded in memory addresses 001D and 001E since step 258 determines that there are three unusable bytes. In step 263, the memory addresses 001D and 001E are checked to see if either is defective, and the determination of decision block 264 will be that neither of these addresses are defective, indicating that the loading of the JUMP instruction is successful without encountering another defective cell. Processing then continues to step 266, where code module F is successfully reloaded into memory addresses 0019 to 001C. The "ins_bcnt" is updated by five bytes, which include the two bytes for the JUMP instruction and the three bytes 001F–0021 that have been bypassed.

This successfully loaded JUMP instruction directs program execution after code module F to bypass a total of five bytes or addresses (i.e., three unusable bytes plus two bytes for the JUMP instruction) to jump directly to address 0022 to bypass the defective cell so that code module G is executed after execution of code module F. The remaining code modules are loaded in a reverse or backward fashion (i.e.,.F, E, D, C, B and A), in the manner described above, into the memory space from 0006 to 0018.

Then, in steps 278 and 282, machine code corresponding to a JUMP instruction is loaded at the beginning of a designated memory space. In this case, a JUMP instruction, represented by byte codes "EB 04", is loaded or written to memory addresses 0000 and 0001. This JUMP instruction forces the CPU 25 to execute the byte code at memory address 0006 (i.e., the Code_Start_Addr) it where the loaded machine code of the first code module A begins. In other words, this JUMP instruction causes execution to jump four bytes, which when added to the two bytes needed to store the codes "EB 04", brings the processing to address 0006.

Thereafter, in steps 286 and 290, the address referencing byte codes are modified, based on the address-referencing table of FIG. 3B, to reflect the additional bytes inserted between code modules.

For absolute address referencing (type 1), Addr1 is at 000F, n-byte is equal to 2, and Addr2 (i.e., the referenced address) is equal to 0007. The number of bytes inserted before the code address Addr2 is 6 (i.e., the number of bytes from memory addresses 0000, to 0005). The 2-byte content at the code address 000F is modified from 0007 to 000D (i.e., 0007+6=000D in hexadecimal) and stored as two bytes "0D" and "00", at memory addresses 0015 and 0016, respectively. The new address of 000F is determined by the following: Addr1_new=000F+6=0015.

For relative address referencing,Addr1 is at 0018, n-byte is equal to 1, and Addr2 (i.e., the referenced address) is equal to 001D. Since the number of bytes inserted between the code addresses addr1 and addr2 is zero, no modification is made to the content at address 0018. Accordingly, the byte code "04" is loaded without modification at the new address of 0023, which is determined by the following: Addr1_new=0018+11=0023, where 11 is the number of byte codes inserted before Addr1 (i.e., 0018). The number 11 is determined by adding the six bytes inserted before the first code module and the five bytes inserted from addresses 001D to 0021.

FIG. 7B illustrates another example of reverse machine-code loading as described in FIG. 5. In this example, the machine code is also the same as that illustrated in FIG. 6A. In addition, two locations in memory (i.e., memory addresses 0020 and 0022) are defective, and the memory device 35 has memory addresses 0000, to 0028 in hexadecimal. First, code module H is successfully loaded into memory addresses 0024 to 0028 in the same manner as in FIG. 7A. Next, code module G is to be loaded into memory addresses 0022 to 0023. However, when steps 246 and 254 are executed with respect to code module G, the loading is unsuccessful because of the defective memory cell 80D at address 0022. Therefore, in steps 258 and 262, a JUMP instruction ("EB 04") is constructed to be loaded in memory addresses 0020 and 0021. However, when steps 263 and 264 are executed with respect to the newly-created JUMP instruction, the loading of the "EB" code of this JUMP instruction fails due to the existence of another defective memory cell at address 0020. Therefore, in accordance with steps 258 and 262, another JUMP instruction ("EB 04") is loaded in memory addresses 001E and 001F. This time, the determination of decision block 264 is "no" since both addresses 0001E and 001F are not defective, so processing proceeds to step 266, where code module G is re-loaded into memory addresses 001C and 001D. The "ins_bcnt" is updated by six bytes, which include the two bytes for the JUMP instruction and the four bytes 0020–0023 that have been bypassed.

This successfully loaded JUMP instruction directs program execution after code module G to bypass a total of six bytes or addresses (i.e., four unusable bytes plus two bytes for the JUMP instruction) to jump directly to address 0024 to bypass the defective cells so that code module H is executed after execution of code module G. The remaining code modules F, E, D, C, B and A are loaded in this order in a reverse or backward fashion into memory addresses 0005 to 001B.

In steps 278 and 282, machine code corresponding to a JUMP instruction is loaded at the beginning of a designated memory space. In this case, a JUMP instruction, represented by byte codes "EB 03", is loaded or written to memory addresses 0000, and 0001. This JUMP instruction forces the CPU 25 to execute the byte code at the Code_Start_Addr 0005. In other words, this JUMP instruction causes execution to jump three bytes, which when added to the two bytes needed to store the codes "EB 03", brings the processing to address 0005, where the loaded machine code of the first code module A begins. Thereafter, in steps 286-and 290, the address referencing byte codes are modified, based on the address-referencing table of FIG. 3B, to reflect the additional bytes inserted between code modules.

For absolute address referencing (type 1), Addr1 is at 000F, n-byte is equal to 2, and Addr2 (i.e., the referenced address) is equal to 0007. The number of bytes inserted before the code address Addr2 is 5 (i.e., the number of bytes from memory address 0000, to 0004). The 2-byte content at the code address 000F is modified from 0007 to 000C (i.e., 0007+5=000C) and stored as two bytes "0C" and "00", at memory addresses 0014 and 0015, respectively. The new address of 000F is determined by the following: Addr1_new=000F+5=0014.

For relative address referencing, Addr1 is at 0018, n-byte is equal to 1, and Addr2 (i.e., the referenced address) is equal to 001D. Since the number of bytes inserted between the code address Addr1 and Addr2 is 6 bytes (i.e., from addresses 001E to 0023), the 1-byte content at address 0018 is modified from "04" to "0A"(i.e., 04+6 bytes=0A) and stored at memory address 001D, which is determined by the following: Addr1_new=0018+5=001D, where 5 is the number of byte codes inserted before code address Addr1 (i.e., 0018).

The method of the present invention can be modified slightly to take advantage of the backward-loading feature. Although the modifications of step 286 to address referencing byte codes can be accomplished after all the code modules have been loaded into the memory device 35, an alternative embodiment of the present invention also allows for dynamic or "on-the-fly" modifications for forward address referencing byte codes. Since the present invention loads in a unique reverse or backward order, the referenced address (Addr2) is known when the referencing address (Addr1) is encountered if the referenced address (Addr2) is at a higher address (i.e., forward address referencing). In this case, the content of the machine code of Addr1 can be immediately modified and loaded into the memory during the machine code loading process.

One possible drawback with the backward-loading method of the present invention, when implemented in the above-described manner, is that all the address referencing will need to be modified every time the machine code is loaded, even if the memory to which the machine code is loaded has no defects. Therefore, the present invention provides an alternative of providing a "default" machine code that has been processed to correspond to anticipated loaded addresses in memory when there is no defect. This default machine code will have all of its address referencing modified in a temporary memory device before the machine code is loaded into any memory, thereby eliminating duplicative address referencing modification during each loading operation and saving overall processing time. The temporary memory device should have no defective memory cells.

For example, assume that the system 20b of FIG. 2B is to be used to write a particular program (e.g., the machine code residing in machine code address space 0000, to 001D of FIG. 6A) into a plurality of PROM chips 24, each having machine code address space 0000, to 0028 of FIG. 6B. The processor of the tester/writer 22 can first create a default machine code for the program which would be loaded into the memory address space 000B to 0028 of FIG. 6B of the PROM 24. In creating the default machine code, all necessary address referencing modifications can be made using the principles explained above. Alternatively, the default machine code can be created by another computer for the tester/writer 22.

Applying this to the example of FIG. 6B, the default machine code will include the first JUMP instruction of "EB 09", the first block of nine bypassed bytes (i.e., addresses 0002 to 000A), and code modules A through H. The default machine code can be loaded into each of the PROMs 24 using the backward loading technique described above. If no defective memory cells are found during the loading of code modules H through A in the particular PROM 24 being loaded, then no memory address correction is needed. On the other hand, if the PROM 24 being loaded has defective memory cells 80D, additional JUMP instructions will be added to bypass these defective memory cells 80D, and the first JUMP instruction will need to be modified to cause operation to jump to the code module A. Note that the first JUMP instruction and the first block of bypassed bytes are considered as part of the default machine code, and not as inserted bytes. Therefore, if the original machine code shown in FIG. 6A is loaded into a defect-free memory shown in FIG. 6B, then the inserted byte count (ins_bcnt) would be eleven (i.e., 0000, to 000A), and some address reference correction will be needed. However, when the machine code of FIG. 6B is used as the default machine code, the first JUMP instruction and the nine bypassed bytes from 0000, to 000A are not considered part of the ins_bcnt.

The present invention provides a reverse order or backward machine code loading scheme that employs JUMP instructions to bypass defective memory cells while maintaining the same functional integrity of the original program code. The present invention is especially useful in writing program code to non-volatile or write-only memories (e.g., PROMs, EPROMs, EEPROMs, or Flash/EEPROMs). The present invention can be implemented without adding any additional hardware or memory cells, and eliminates the need for the time-consuming testing of on-chip memory during manufacture thereof, thereby reducing the manufacturing time and costs. Actual repair or correction of defective memory cells is obviated. In addition, defective memory cells 80D can be detected and bypassed "on-the-fly" during loading, and forward address-referencing byte code modification can also be done during the loading of the machine code.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of loading machine code into a memory device, comprising:
   (a) providing a memory start address and a memory end address within the memory device, the memory end address being at a higher address than the memory start address;
   (b) providing the machine code in the form of a plurality of code modules, the plurality of code modules including a first code module and a last code module;
   (c) loading the last code module into the memory device near the memory end address;
   (d) loading the code module preceding the last loaded code module into the memory device at memory cells preceding the last loaded memory cell addresses; and
   (e) repeating step (d) for each preceding code module until the first code module has been loaded into the memory device.

2. The method of claim 1, wherein the code modules include at least one complete instruction step.

3. The method of claim 1, wherein the code modules include at least one data block.

4. The method of claim 1, wherein the code modules include at least one complete instruction step and at least one data block.

5. The method of claim 1, wherein the memory device has at least one defective memory cell, and furthers including:
   (f) checking for the existence of a first defective memory cell during the loading of each code module;

(g) after a first defective memory cell has been identified, constructing a first JUMP instruction to cause the execution of the machine code to skip the first defective memory cell; and (h) loading the first JUMP instruction into memory cells at lower memory addresses than the first defective memory cell; and (i) re-loading the last-loaded code module into memory cells preceding the first JUMP instruction.

6. The method of claim 5, wherein the checking for the existence of a first defective memory cell is performed after the loading of a complete code module.

7. The method of claim 5, further including:

(h1) checking for the existence of a second defective memory cell at the memory cells where the first JUMP instruction has been loaded;

(h2) after the second defective memory cell is found, constructing a second JUMP instruction to cause the execution of the machine code to skip the second defective memory cell where part of the first JUMP instruction has been loaded and the first defective memory cell where part of a just-loaded code module has been loaded;

(h3) loading the second JUMP instruction into memory cells at lower memory addresses than the second defective memory cell; and (h4) re-loading the last-loaded code module into memory cells preceding said second JUMP instruction.

8. The method of claim 1, further including:

(f) constructing a JUMP instruction; and (g) loading the JUMP instruction into the memory to direct the execution of the machine code to the first code module.

9. The method of claim 1, further including:

generating a machine code table that provides address referencing information for absolute addressing and relative addressing.

10. The method of claim 5, further including:

modifying the content of an address-referencing instruction code step according to a change in a referenced memory address; and loading the modified address-referencing instruction code step into memory, wherein the change in the referenced memory address is caused by additional code being loaded into the memory device.

11. The method of claim 10, wherein the additional code includes the first JUMP instruction and the memory cells skipped by the first JUMP instruction.

12. The method of claim 10, wherein said address referencing instruction code step is an absolute-address referencing instruction step.

13. The method of claim 12, wherein an absolute address is modified by a number depending on the total number of bytes that have been inserted from the memory start address.

14. The method of claim 10, wherein said address referencing instruction code step is a relative-address referencing instruction step.

15. The method of claim 14, wherein a relative address is modified by a number depending on the number of bytes that have been inserted between a current address and a target address contained in the relative address.

16. The method of claim 10, wherein the address referencing instruction code step is a forward-address referencing instruction step.

17. The method of claim 1, further including:

skipping the loading of a backward-address referencing instruction code during the loading of the code modules.

18. The method of claim 17, further including:

after the loading of the first code module, modifying the content of a backward-address referencing instruction code step according to a change in a referenced memory address; and loading the modified backward-address referencing instruction code step into the appropriate memory cells.

19. The method of claim 1, wherein when code modules are being loaded into the memory device:

modifying the content of a forward address-referencing instruction code step according to a change in a referenced memory address; and loading the modified forward address-referencing instruction code step into the memory device.

20. A memory system, comprising:

a memory device having a plurality of memory cells, of which at least one memory cell is defective;

means for organizing a machine code into a plurality of modules;

means for loading the machine code modules in a reverse order into the memory device;

means for identifying the addresses of any defective memory cells in the memory device; and means for modifying machine code to bypass the defective memory cells.

21. The memory system of claim 20, wherein the modifying means includes means for skipping the defective memory cells and loading machine code into memory cells other than the defective memory cells.

22. The memory system of claim 21, wherein the skipping means includes means for constructing a "JUMP" instruction to cause the execution of the machine code to skip the defective memory cell.

23. The memory system of claim 21, further including means for modifying the addressing of the loaded machine code.

24. The memory system of claim 23, wherein the address modifying means includes means for correcting addresses referenced by certain instructions, and for loading the modified machine code into the memory device.

25. The memory system of claim 21, further including means for modifying the addressing of an instruction step prior to loading said instruction step into the memory device.

26. A method of loading machine code from a program into a plurality of memory devices, comprising:

(a) providing an anticipated memory start address and a memory end address for the memory devices, the memory end address being at a higher address than the memory start address;

(b) providing the machine code in the form of a plurality of code modules, the plurality of code modules including a first code module and a last code module;

(c) loading the last code module into a temporary memory device near the memory end address;

(d) loading the code module preceding the last loaded code module into the temporary memory device at memory cells preceding the last loaded memory cell addresses;

(e) repeating step (d) for each preceding code module until the first code module has been loaded into the temporary memory device; and (f) loading the machine code from the temporary memory into the plurality of memory devices.

27. The method of claim 26, wherein a first of the plurality of memory devices has at least one defective memory cell, and further including:

(g) checking for the existence of a first defective memory cell during the loading of each code module;

(h) after a first defective memory cell has been identified, constructing a first JUMP instruction to cause the execution of the machine code to skip the first defective memory cell; and (i) loading the first JUMP instruction into memory cells at lower memory addresses than the first defective memory cell; and (j) re-loading the last-loaded code module into memory cells at subsequently lower memory addresses than the loaded first JUMP instruction.

28. The method of claim 27, further including:

(i1) checking for the existence of a second defective memory cell at the memory cells where the first JUMP instruction has been loaded;

(i2) after the second defective memory cell is found, constructing a second JUMP instruction to cause the execution of the machine code to skip the second defective memory cell where part of the first JUMP instruction has been loaded and the first defective memory cell where part of a just-loaded code module has been loaded;

(i3) loading the second JUMP instruction into memory cells at lower memory addresses than the second defective memory cell; and (i4) re-loading the last-loaded code module into memory cells at subsequently lower memory addresses than the loaded second JUMP instruction.

29. The method of-claim 27, further including:

modifying the content of an address-referencing instruction code step according to the change in the referenced memory address; and loading the modified address-referencing instruction code step into the temporary memory, wherein the change in the referenced memory address is caused by additional code being loaded into the temporary memory device.

30. A method of loading machine code into a memory device, comprising:

allocating a memory start address and a memory end address within the memory device; and loading the machine code into the memory device within the memory start address and the memory end address, wherein a first part of the machine code is loaded into a first memory location prior to the loading of a second part of the machine code into a second memory location, with the first memory location being at a higher memory address than the second memory locations, and wherein the first part of the machine code is executed subsequent to the second part of the machine code during execution of the machine code.

* * * * *